(12) United States Patent
Schulz

(10) Patent No.: US 6,361,016 B1
(45) Date of Patent: Mar. 26, 2002

(54) PINCH VALVE HAVING A FLEXIBLE TUBE MEMBER

(75) Inventor: Manfred Schulz, Überlingen (DE)

(73) Assignee: Ferton Holding S.A., Delemont (CH)

( * ) Notice: Subject to any disclaimer, the term of this patent is extended or adjusted under 35 U.S.C. 154(b) by 0 days.

(21) Appl. No.: 09/549,014

(22) Filed: Apr. 14, 2000

(30) Foreign Application Priority Data

Apr. 19, 1999 (DE) .......................... 199 17 622

(51) Int. Cl.⁷ .................................................. F16K 7/06
(52) U.S. Cl. .............................................. 251/7; 251/4
(58) Field of Search .................... 251/4, 7, 8, 148, 251/150, 151, 152

(56) References Cited

U.S. PATENT DOCUMENTS

| | | | | |
|---|---|---|---|---|
| 2,197,995 A | * | 4/1940 | Crowley ........................ | 251/7 |
| 2,865,591 A | * | 12/1958 | Holinshead ..................... | 251/8 |
| 4,146,018 A | * | 3/1979 | Aldridge et al. ............. | 251/7 X |
| 4,264,020 A | * | 4/1981 | Loiseau ....................... | 251/7 X |
| 4,518,145 A | * | 5/1985 | Keltz et al. ................... | 251/7 X |
| 4,635,897 A | * | 1/1987 | Gallant ....................... | 251/7 X |
| 4,899,783 A | * | 2/1990 | Yusko, Jr. et al. ........... | 251/7 X |
| 4,960,259 A | | 10/1990 | Sunnanväder et al. ......... | 251/7 |

FOREIGN PATENT DOCUMENTS

| | | |
|---|---|---|
| DE | 1 097 778 | 1/1961 |
| EP | 0 097 288 | 1/1984 |
| GB | 2 147 394 | 5/1985 |

* cited by examiner

Primary Examiner—Kevin Shaver
Assistant Examiner—Eric Keasel
(74) Attorney, Agent, or Firm—Ratner & Prestia

(57) ABSTRACT

A pinch valve comprises a flexible tube member as a portion of a fluid line which for a flow control is arranged on a separate insert member made of a rigid material and provided with two axially aligned adapter pieces of the fluid line for being pinched by an actuator which directly contacts the flexible tube member at a control position of its cross-sectional area.

13 Claims, 1 Drawing Sheet

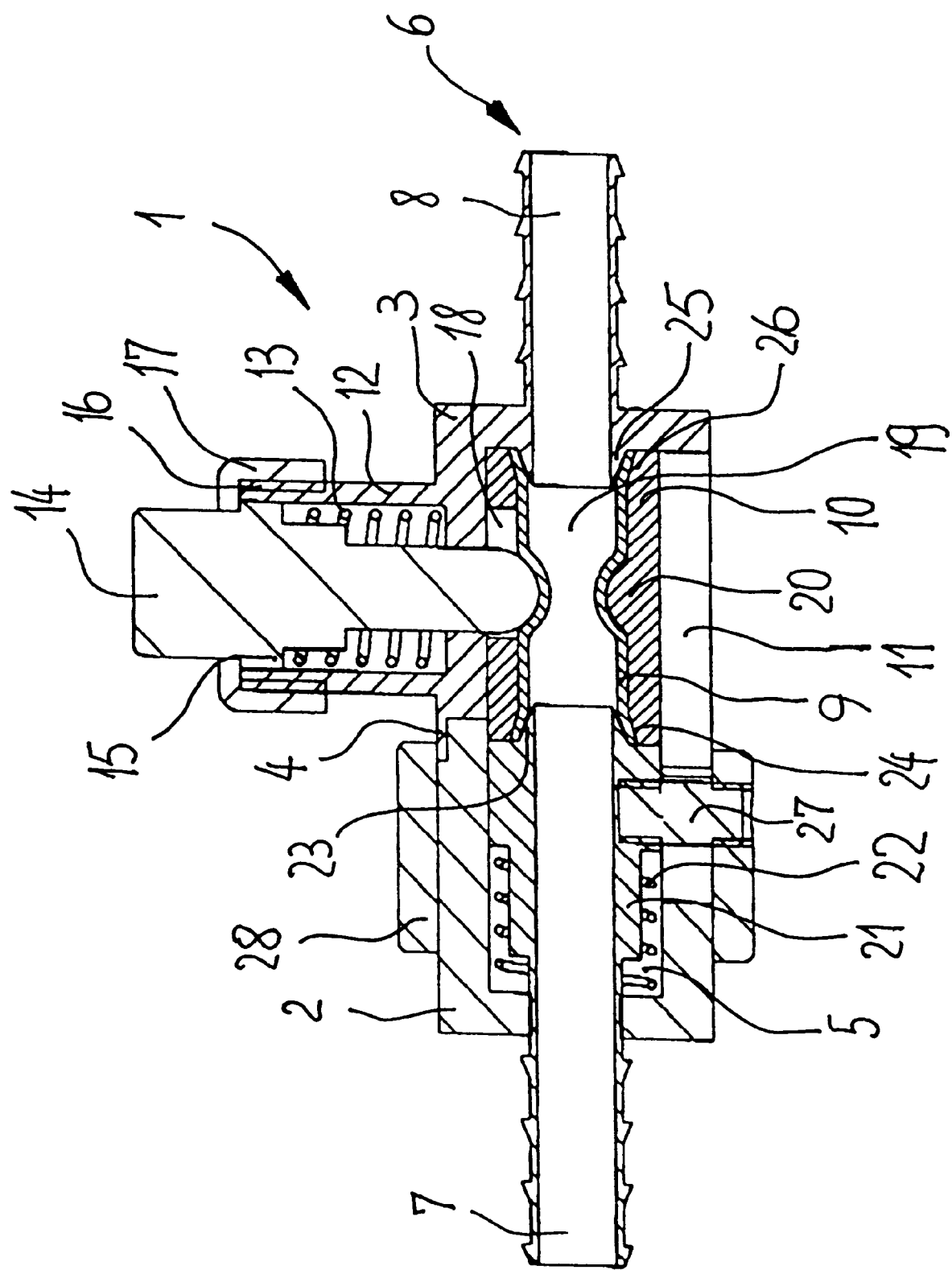

PINCH VALVE HAVING A FLEXIBLE TUBE MEMBER

FIELD OF THE INVENTION

This invention relates to a pinch valve which comprises a flow control member in the form of a flexible tube member as a portion of a fluid line and arranged for being connected to the fluid line by means of two adapter pieces. A pinch valve of the kind to which the present invention relates is more generally referred to by the introductory portion of claim 1.

BACKGROUND OF THE INVENTION

The European Patent Publication EP 0 097 288 B1 discloses a pinch valve of the kind in which a flexible tube member forms a portion of a fluid line. The fluid line is arranged for feeding an air containing tooth cleaning powder to a nozzle of a dental handpiece of a prophylactic apparatus for cleaning teeth in combination with a flow of water as also supplied to said nozzle for being sprayed in common with the particles of the cleaning powder against a tooth surface under treatment. The known pinch valve is structured with a cylindrical valve chamber through which the flexible tube member is passed. A pneumatically moveable piston is arranged in the valve chamber for being moved against the bias force of a spring. The piston when moved pneumatically under a predetermined actuating pressure acts on the flexible tube member When the flexible tube member is fully pinched by the piston so that no air containing tooth cleaning powder particles will anymore reach the nozzle of the handpiece. When otherwise the actuating pressure on the piston has been stopped the piston will be retracted by the force of the bias spring and a free passageway for the cleaning powder will again be obtained. For avoiding any excessive stress of the flexible material of the flexible tube member an alternative embodiment of the known pinch valve is provided with a piston which is as well pneumatically moveable but which houses a separate pressure member which is influenced by a spring force in such a manner that when the piston has reached a stop position with respect to the valve chamber under a predetermined actuating pressure the bias spring will then force the pressure member into contact with the flexible tube member for its pinching so that with a flow blocking of the cleaning powder the cleaning of the tooth surface will then be interrupted.

The British Patent GB 2, 147, 394 A discloses a pinch valve in which a portion of a flexible fluid line is passed through a cylindrical valve chamber for being actuated by a pneumatically moveable piston. The valve chamber through which a fluid line is passed comprises a lining structured as a sleeve of a highly flexible material of a substantial thickness such as a porous rubber material or a porous plastic material. The sleeve serves the purpose of avoiding an excessive stress of the fluid line when it is pinched by the piston also for blocking the flow of air containing tooth cleaning powder particles to a nozzle of a dental handpiece of a prophylactic apparatus.

The German Patent Publication DE-AS 1 097, 778 discloses a pinch valve in which a flexible tube member forms a flow control member as a portion of a fluid line. The flexible tube member comprises at least two layers of different flexible properties which two layers are in contact with each other as being either relatively moveable or fixedly interconnected. The flexible tube member is inserted into a valve chamber in an exchangeable manner for being actuated by an actuator which is moveable by means of a spindle drive. The outer layer of the flexible tube member is arranged for supporting the inner layer so that for such supporting purposes the outer layer is structured as a molded body of a respectively thick rubber material in comparison with the inner layer. The inner layer comprises a relatively thin foil or film made of a material which is chosen under consideration of the flow characteristics of the fluid which is to be controlled by the pinch valve when being transported through the fluid line. The inner layer of the flexible tube member therefore specifically comprises a plastic material of a much higher wear resistance and of a much better coefficient of friction than the rubber material of the outer layer.

SUMMARY OF THE INVENTION

An object of the present invention is to provide a pinch valve of the kind as above described which will allow a simple exchange of the flexible tube member with an easily manufacturable structure of the valve. The pinch valve should also be structured such as to allow a very sensitive variable flow control of a fluid which is transported through the fluid line whereby the flow should be continuously controllable between a maximum and a minimum value.

In accordance with a present invention a pinch valve of the general kind as referred to is provided with a flexible tube member which is arranged on a separate insert member. This separate insert member is made of a rigid material for supporting the flexible tube member and comprises a sealed connection with the two adapter pieces of the fluid line in common with the flexible tube member. The insert member is inserted into a valve housing of the pinch valve in such a manner that the actuator may directly contact the flexible tube member for pinching the same when actuated.

By arranging the flexible tube member on a separate rigid insert member less wear resistance of the flexible tube member will exist. The flexible tube member may therefore be pinched many more times until it gets broken in comparison with the structures of the known pinch valves so that constant control characteristics may be obtained over an extended period of time until an exchange of the flexible tube member becomes necessary. By providing the specific arrangement of the flexible tube member on a rigid insert member this will also allow the provision of a one-way component of the pinch valve for an easy exchange of which there would be provided a suitable ejection opening in the valve chamber of the valve housing through which on the other side such a insert member is insertable into the valve chamber.

Other objects, features and advantages of the present invention will become apparent from reading the following description of a preferred embodiment of a pinch valve according to the present invention.

BRIEF DESCRIPTION OF THE DRAWING

The invention will now be described, by way of example, with reference to the accompanying drawing, which shows a longitudinal section view of a pinch valve in accordance with the present invention.

DETAILED DESCRIPTION OF THE PREFERRED EMBODIMENT

The pinch valve 1 as illustrated in the drawing comprises a valve housing having two pieces 2 and 3 which are interconnected by a screw connection 4 and which define a cylindrical valve chamber 5 which is passed by a portion 6 of a fluid line.

The portion 6 of the fluid line comprises two adapter pieces 7 and 8 having projecting ends for allowing a connection with connecting ends of a fluid line with a slip-on fitting. The actual connection of the pinch valve 1 is rather obtained by a flexible tube member 9 providing a passage which is axially aligned with the two adapter pieces 7 and 8 with which also a through hole of a separate insert member 10 is axially aligned as well.

The separate insert body 10 is made of a rigid material for supporting the flexible tube member 9. The insert member 10 may be inserted into the valve chamber 5 through an ejection opening 11 of the one piece 3 of the valve housing. Opposite to the ejection opening 11 which may be closed for example by a screw cap (not shown) a hollow cylindrical portion 12 of the housing houses an actuator 14 which is forced outwardly by means of a bias spring 13. The actuator 14 has a collar 15 which engages the inner wall of the cylindrical portion 12 for being axially guided when the actuator 14 is moved inwardly against the force of the bias spring 13 by means of a screw cap 17 which is screw connected at 16 with the cylindrical portion 12. The screw cap 17 engages the collar 15 of the actuator 14 at its forward end.

The inner end portion of the actuator 14 passes through an opening of the valve housing and further through an opening 18 of the insert member 10. The opening 18 is formed as a slit having a slit length larger than the inner end portion of the actuator 14 which is also guided in the opening of the valve housing. The actuator 14 is in direct contact with the flexible tube member 9 so that the same may be pinched directly by the actuator 14 for reaching a variable flow control of the fluid which is transported through the fluid line. The cross-sectional area 19 of the flexible tube member 9 is therefore continuously variable at the position where the pressing force of the actuator 14 becomes effective whereby this pressing force is backed by an inner projection 20 of the insert member 10.

The actuator 14 is illustrated with a relative position in which the cross-sectional area 19 of the flexible tube member 9 is adjusted to a predetermined intermediate size. This predetermined intermediate size of the cross-sectional area 19 may be further reduced by pressing the actuator 14 further inwardly without any assistance of the screw cap 17 whereby when the actuator 14 is pushed to its inward limit against the force of the bias spring 13 a flow blocking of the fluid transported through the fluid line will be obtained.

For obtaining an easy exchange of the insert member 10 together with the flexible tube member 9 provision is made for obtaining a relatively moveable arrangement for the one adapter piece 7 on the valve housing. The adapter piece 7 is for this purpose integrated with a guide member 21 which is axially guided by the bore of the cylindrical valve chamber 5. The guide member 21 is pressed forwardly by the force of a bias spring 21 for engaging an adjacent end of the flexible tube member 9. For obtaining a fluid-tight connection there is provided on the forward end of the guide member 21 a tapered seat for a corresponding seal lip 23 of the flexible tube member 9 which under the force of the bias spring 22 is pressed against a corresponding tapered seat 24 at the adjacent end of the insert member 10. The force of the bias spring 22 is chosen such that by this engagement of the guide member 21 with the flexible tube 9 in a sealing engagement also with the insert member 10 the same engagement is obtained at the opposing end where the flexible tube member 9 is connected with the adapter piece 8 which is fixedly arranged on the valve housing. As in case of the relatively moveable adapter piece 7 there is also provided a tapered seat for a slip-on fit of a seal lip 25 of the adjacent end of the flexible tube member 9 which is backed by a tapered seat 26 of the adjacent end of the insert member 10 for obtaining the fluid-tight connection of the adapter piece 8 with both the flexible fluid member 9 and the insert member 10. There is further provided a tappet 27 on a slide member 28 which is in engagement with the guide member 21. The guide member 21 may therefore be moved to the left by moving the slide member 28 also to the left against the force of the bias spring 22. This movement to the left will release the moveable adapter piece 7 from the adjacent end of the flexible tube 9 and also from the insert member 10 so that with a retracted position of the actuator 14 the insert member 10 will also be released from the adapter piece 8 by moving it slightly to the left. The insert member 10 may then be taken out from the valve housing through the ejection opening 11 in common with the flexible tube member 9. It may replaced as a one-way component of the arrangement which is insertable into the valve chamber 5 through the ejection opening and which is positionally fixed by the relatively moveable adapter piece in the position illustrated in the drawing.

The pinch valve 1 as described above may be used for example as a flow control device for controlling the flow control of a purging fluid which is used in an endoscope for cleaning the exterior surface of an image passing means at a distal end of a hollow shaft of the endoscope for removing image impeding agents so as to secure a clear view during an endoscopic procedure. The pinch valve as described for a preferred embodiment would allow for such a specific utility a very sensitive variable flow control of the purging fluid and would be used instead of a trumpet valve which is usually provided for endoscopes.

The flexible tube member 9 and the insert member 10 are preferably structured as a one-way product which may be easily exchanged whenever the control characteristics of the pinch valve have changed. Such a change of the control characteristics of the pinch valve could be caused either by a pre-mature fatigue of the material of the tube member or by an excessive wear. When structured as a one-way product this would of course also allow an implementation of the pinch valve with different nominal sizes of the cross-sectional area of the flexible tube member at the control position of the actuator.

Instead of an arrangement of the flexible tube member in a through bore of the insert member there could also be provided an arrangement of the flexible tube member on the cylindrical outer surface of the insert member. The insert member would be structured in this case as a solid body the cylindrical outer surface of which would be axially aligned with connecting ends of two adapter pieces of the interconnected fluid line. The flexible tube member supported by the insert member would form a flow channel the cross-sectional area of which would be controlled by the actuator in the same manner as described above.

It should be also understood that instead of a relatively moveable arrangement of only one adapter piece also the second adapter piece could be arranged in a relatively moveable manner. It should be further understood that the insert member could be structured with two separate pieces that are biased by a spring towards each other and towards the interconnections between the flexible tube member and the two adapter pieces. Such an alternative structure would also allow an easy exchange of the tube member and/ or of the insert member as a correspondingly structured one-way product.

I claim:

1. A pinch valve for controlling a fluid flow under pressure through a fluid line, comprising:

a flexible tube member or pinch tube;

a separate unitary insert body which is adapted for being inserted into a valve chamber in a surrounding valve housing and comprising a rigid material for supporting the flexible tube member or pinch tube in an axial through-hole of the insert body;

an actuator in direct contact with the flexible tube member or pinch tube movably connected to the valve housing and movable against a resetting force of a first bias spring for varying the cross-sectional area of the flexible tube member by pinching the flexible tube member against the insert member; and first and second adapter pieces in axial alignment with the valve chamber providing a sealed connection with opposing respective ends of the flexible tube member or pinch tube;

the first and second adapter pieces being arranged for providing a sealed connection with connecting ends of a fluid line;

wherein at least one of the first and second adapter pieces is axially moveable away from the unitary insert body for allowing insertion of the insert body and flexible tube member or pinch tube into the valve chamber in the valve housing and removal of the insert body and flexible tube member or pinch tube out of the valve chamber in the valve housing.

2. The pinch valve according to claim 1 wherein said at least one axially moveable adapter piece is biased by a second spring force into a sealed connection with a respective end of said flexible tube member or pinch tube supported by said insert body.

3. The pinch valve according to claim 1 wherein one of said first and second adapter pieces is axially moveable away from said insert body and one of said first and second adapter pieces is fixedly connected to said valve housing.

4. The pinch valve according to claim 1 wherein said flexible tube member and said insert body are throw-away or non-returnable members of the pinch valve, adapted for being sealingly connected to said connecting ends of said fluid line by said first and second adapter to pieces provide a continuous fluid channel.

5. The pinch valve according to claim 1 wherein said unitary insert body is provided with tapered seats on opposing first and second ends of the flexible tube member or pinch tube and said first and second adapter pieces are provided with correspondingly tapered sealing lips for engaging said tapered seats to provide a sealed connection.

6. The pinch valve according to claim 5 wherein said tapered sealing lips of said first and second adapter pieces are sealed against said tapered seats of said insert body by said first and second ends of said flexible tube member or pinch tube compressed between said tapered lips and said tapered seats.

7. The pinch valve according to claim 5 wherein at least one of the first and second adapter pieces is axially moveable away from the unitary insert body within the valve housing without movement of the valve housing itself for allowing removal of the insert body and flexible tube member or pinch tube out of the valve chamber in the valve housing.

8. The pinch valve according to claim 7 wherein said valve housing includes an opening of dimension sufficient to permit removal of the insert body and flexible tube or pinch tube therethrough out of the valve chamber upon disengaging the at least one axially movable adapter piece from the flexible tube member or pinch tube.

9. The pinch valve according to claim 1 wherein said actuator is structured as an adjustment member moveable toward said valve housing against the resetting force of the first bias spring for setting an intermediate cross-sectional area of the flexible tube member or pinch tube within a continuously variable range of cross-sectional areas prior to activating said actuator.

10. The pinch valve according to claim 9, wherein said actuator is housed in a hollow cylindrical portion of said valve housing, said first biasing spring biasing said actuator toward a screw cap in screwed connection with said hollow cylindrical portion for continuously varying the intermediate cross-sectional area of said flexible tube member or pinch tube by turning said screw cap to move said actuator against said flexible tube member or pinch tube.

11. The pinch valve according to claim 1 wherein said unitary insert body is insertable into said valve chamber of said surrounding valve housing through an opening in the valve housing which also serves as an ejection opening for replacement of the insert body, and wherein said valve housing further includes a second opening through which said actuator, when arranged outside of the valve housing, contacts said flexible tube member or pinch tube directly.

12. The pinch valve of claim 11, wherein said valve chamber houses a guide member carrying said at least one axially moveable adapter piece, a second bias spring biasing said guide member into a position sealing said at least one axially moveable adapter piece with said unitary insert body and a respective end of said flexible tube member or pinch tube.

13. The pinch valve according to claim 12, further comprising a slide member with a tappet for moving said guide member against said second bias spring to disengage said at least one axially moveable adapter piece from said insert body for removal of said insert body and said flexible tube member or pinch tube from said valve chamber.

* * * * *